(12) United States Patent
Chujo et al.

(10) Patent No.: US 6,444,751 B1
(45) Date of Patent: Sep. 3, 2002

(54) PROCESS FOR PRODUCING VINYL ALCOHOL POLYMER COMPOSITION

(75) Inventors: Yoshiki Chujo, Kyoto; Ryo Tamaki, Urasoe; Kanenori Itoh; Yukiatsu Komiya, both of Kurashiki, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/554,594

(22) PCT Filed: Sep. 22, 1999

(86) PCT No.: PCT/JP99/05188

§ 371 (c)(1),
(2), (4) Date: May 26, 2000

(87) PCT Pub. No.: WO00/18838

PCT Pub. Date: Apr. 6, 2000

(30) Foreign Application Priority Data

Sep. 28, 1998 (JP) ............................................. 10-290012

(51) Int. Cl.[7] ............................................. C08G 63/48
(52) U.S. Cl. ............................................. 525/61
(58) Field of Search ............................................. 525/61

(56) References Cited

U.S. PATENT DOCUMENTS

| | | | | |
|---|---|---|---|---|
| 3,491,075 A | | 1/1970 | Dekking | |
| 3,985,719 A | * | 10/1976 | Hoyt | ........................... 526/10 |
| 5,412,016 A | | 5/1995 | Sharp | |
| 6,162,864 A | * | 12/2000 | Tanihara | ...................... 525/60 |

FOREIGN PATENT DOCUMENTS

| | | |
|---|---|---|
| DE | 15 70 282 | 2/1970 |
| DE | 276 484 | 2/1990 |
| EP | 0 581 576 | 2/1994 |
| FR | 2 527 617 | 12/1983 |
| FR | 2 593 508 | 7/1987 |
| GB | 2 116 981 | 10/1983 |
| JP | 6-192454 | 7/1994 |
| JP | 10-1515 | 1/1998 |

* cited by examiner

*Primary Examiner*—Paul R. Michl
(74) *Attorney, Agent, or Firm*—Oblon, Spivak, McClelland, Maier & Neustadt, P.C.

(57) ABSTRACT

A solution containing a metal alkoxide or oligomers thereof, a vinyl carboxylate polymer and an organic solvent is used, and, while low boiling substances containing the organic solvent is removed, both polycondensation of the metal alkoxide or oligomers thereof and saponification of the vinyl carboxylate polymer are conducted in parallel with each other and in the same reaction zone. On the occasion, the metal alkoxide or oligomers thereof is used in an amount of the metal atom present in the metal alkoxide or oligomers thereof of 0.01 to 100 moles based on 100 moles of the acyl group originating from the vinyl carboxylate unit present in the vinyl carboxylate polymer. This process can produce vinyl alcohol polymer compositions comprising a metal oxide without causing property unevenness, the compositions being capable of maintaining their excellent gas-barrier properties when exposed to high-temperature and high-humidity conditions or after being repeatedly bent. The process thus can produce, commercially advantageously, materials useful as food-packaging materials and the like.

18 Claims, No Drawings

PROCESS FOR PRODUCING VINYL ALCOHOL POLYMER COMPOSITION

TECHNICAL FIELD

The present invention relates to a process for commercially advantageously producing vinyl alcohol polymer compositions while suppressing generation of their property unevenness, the compositions having excellent gas-barrier properties, in particular excellent gas-barrier properties under high-temperature and high-humidity conditions, and being capable of maintaining the excellent gas-barrier properties even after being repeatedly bent.

BACKGROUND ART

Materials for packaging foods and other various items are often required to have good gas-barrier properties, in particular good oxygen gas-barrier property, in order to prevent the contents from being degraded by, for example, oxidation with oxygen. Especially on packaging of foods, presence of oxygen causes microorganisms to proliferate and rot the contents. Conventional packaging materials for foods are therefore provided with a gas-barrier layer to protect the contents against penetration of oxygen or the like.

Examples of such a gas-barrier layer are metal foils and layers on which a metal or metal compound has been deposited. In general, aluminum foils and layers on which aluminum or silica has been deposited are used for this purpose. However, use of these metals causes the contents to become invisible and the packaging materials to become difficult to dispose after use.

Vinyl alcohol polymers having good gas-barrier properties, such as polyvinyl alcohol and ethylene-vinyl alcohol copolymer are sometimes used as the gas-barrier layer. These vinyl alcohol polymers have the advantages of being transparent and causing less problem on disposal after use, so that they have been applied to wider range of uses.

These vinyl alcohol polymers show good gas-barrier properties because they crystallize due to hydrogen bonding of hydroxyl groups present in their molecules. They exhibit therefore good gas-barrier properties when they are dry. However, when they have absorbed moisture such as water vapor present in the surrounding atmosphere, which loosen the hydrogen bonds, they tend to become poor in gas-barrier properties. As a result, it is difficult to provide conventional vinyl alcohol polymers, such as polyvinyl alcohol, with satisfactory gas-barrier properties under high-temperature and high-humidity conditions.

A method for decreasing the moisture-absorbing property of vinyl alcohol polymers comprises copolymerizing an olefin such as ethylene, yielding ethylene-vinyl alcohol copolymer. However, this kind of copolymerization, which decreases the content of vinyl alcohol units, tends to impair the inherent gas-barrier properties. Consequently, this method cannot provide a vinyl alcohol polymer being capable of exerting good gas-barrier properties under both dry condition and high-temperature and high-humidity conditions.

A process for preparing an organic/inorganic complex comprising an organic polymer and a metal oxide dispersed relatively finely in the polymer has been proposed. This process comprises, making use of the what is known as sol-gel process, polycondensing a metal alkoxide such as a silicon alkoxide in the presence of an organic polymer.

For example, Japanese Patent Application Laid-open Nos. 278968/1997 and 99390/1996 disclose, in order to obtain vinyl alcohol polymer-based materials possessing improved water resistance, a process which comprises polycondensing a metal alkoxide in the presence of a vinyl alcohol polymer or modified products thereof, to obtain compositions comprising the vinyl alcohol polymer and a metal oxide. This process however causes, during the polycondensation, a decrease in phase-separated state (i.e. increase in the phase-separation size). This is attributable to the high crystallinity of the vinyl alcohol polymer or modified products thereof used. In the meantime, several reports have proposed a process capable of producing compositions (organic/inorganic complexes) with improved phase-separation state (i.e. with finer phase-separation size) of polyvinyl alcohol and a metal oxide (silica). This process comprises the steps of dissolving tetramethoxysilane and polyvinyl acetate in a ratio by weight of 2:1 or 5:1, together with hydrochloric acid as a catalyst, in methanol to prepare a solution and, while evaporating low boiling substances containing the methanol from the solution, conducting both polycondensation of tetramethoxysilane and saponification of the polyvinyl acetate in parallel with each other in the same reaction zone. See for example Polymer. Prep. Jpn. 45(5) p.907 (1996) and Appl. Organometal. Chem. 12 p.755 (1998).

According to the study made by the present inventors, it has been found that the compositions comprising a vinyl alcohol polymer and a metal oxide obtained by the above process using the vinyl alcohol polymer or its modified products as a starting material are not only insufficient in the fineness of phase-separation size but have a large unevenness in the gas-barrier properties, which vary depending on the place of the prepared composition. The compositions therefore cause a high out-of-grade ratio, when used as films for packaging foods or as gas-barrier materials such as gas-barrier layers for such films. In addition, it has also been found that the gas-barrier properties of these compositions cannot be said to have sufficient moisture resistance.

The present inventors' study has also revealed the following fact. That is, the above compositions of polyvinyl alcohol and a metal oxide (silica) obtained by the process comprising using tetramethoxysilane and polyvinyl acetate in a ratio by weight of 2:1 or 5:1 (i.e. the molar ratio between the silicon atom present in the tetramethoxysilane and the acetyl group in the polyvinyl acetate of 113:100 or 283:100) exhibit, when exposed to repeated bending, impaired gas-barrier properties, perhaps because of formation of fine gaps. The compositions are thus unusable as films for packaging foods or as gas-barrier layers for such films.

Accordingly, an object of the present invention is to provide a commercially advantageous process for producing a vinyl alcohol composition containing a metal oxide with little property unevenness, said composition being capable of maintaining its excellent gas-barrier properties at high levels even under high-temperature and high-humidity conditions and after being repeatedly bent.

DISCLOSURE OF THE INVENTION

As a result of an intensive study to solve the above problems, the present inventors found that the above object can be achieved by providing a process which comprises using a solution comprising a vinyl carboxylate polymer and a metal alkoxide in an organic solvent and, while removing low boiling substances, conducting both saponification of said vinyl carboxylate polymer and polycondensation of said metal alkoxide in parallel with each other, said solution containing a specific amount based on the vinyl carboxylate polymer of said metal alkoxide. The present invention was completed based on this finding.

The present invention thus provides a process for producing vinyl alcohol polymer compositions comprising a metal oxide and a vinyl alcohol polymer, which comprises using a solution comprising a metal alkoxide or oligomers thereof, a vinyl carboxylate polymer and an organic solvent, and, while removing low boiling substances containing the organic solvent, conducting both polycondensation of said metal alkoxide or oligomers thereof and saponification of said vinyl carboxylate polymer in parallel with each other and in the same reaction zone, said solution containing said metal alkoxide or oligomers thereof in a ratio of 0.01 to 100 moles of the metal atom contained in said metal alkoxide or oligomers thereof based on 100 moles of the acyl group originating from the vinyl carboxylate unit present in said vinyl carboxylate polymer.

BEST MODES FOR CARRYING OUT THE INVENTION

The present invention is now described in detail.

The process for producing vinyl alcohol polymer compositions according to the present invention is based on the known process (hereinafter sometimes referred to as "in situ sol-gel reaction-saponification") for producing vinyl alcohol polymer compositions comprising a metal oxide and a vinyl alcohol polymer (gel-like or solid organic/inorganic complexes), which comprises using a solution (sol) comprising a metal alkoxide or oligomers thereof and a vinyl carboxylate polymer in an organic solvent and, while removing low boiling substances containing the organic solvent, conducting both polycondensation of the metal alkoxide or oligomers thereof and saponification of the vinyl carboxylate polymer in parallel with each other and in the same reaction zone.

The vinyl carboxylate polymer used in the present invention is a polymer comprising units from a vinyl carboxylate and includes vinyl carboxylate homopolymers and copolymers obtainable by addition polymerization of a vinyl carboxylate and other comonomers. Examples of preferred vinyl carboxylates are vinyl acetate, vinyl propionate and vinyl 2-methylpropionate, of which vinyl acetate is particularly preferred. Examples of the comonomers are α-olefins, e.g. ethylene, propylene and 1-butene; vinyl ethers, e.g. methyl vinyl ether, ethyl vinyl ether and t-butyl vinyl ether; allyl alcohol; and vinyltrimethylsilane. Examples of vinyl carboxylate polymers usable for the process of the present invention are polyvinyl carboxylates, e.g. polyvinyl acetate and polyvinyl propionate, and ethylene-vinyl carboxylate copolymers, e.g. ethylene-vinyl acetate copolymer and ethylene-vinyl propionate copolymer, of which polyvinyl acetate and ethylene-vinyl acetate copolymer are particularly preferably used.

Where a polyvinyl carboxylate or ethylene-vinyl carboxylate copolymer is used as the vinyl carboxylate polymer, it is desirable, in view of good balance between the gas-barrier properties of the resulting composition under both low-humidity and high-humidity conditions, that the content of ethylene units be in a range of 0 to 70 mole % based on the moles of total constituting units and more desirably in a range of 0 to 60 mole % on the same basis.

The vinyl carboxylate polymer used may have any molecular weight ranging from small to large one with no particular limitation. It is, however, preferred that the degree of polymerization be in a range of 300 to 6,000, more preferably in a range of 300 to 3,000, which insures that the resulting vinyl alcohol polymer compositions have excellent gas-barrier properties. Besides, the vinyl carboxylate polymer may have been modified by, for example, silyl group-modification or boronic acid-modification, within limits not to impair the effect of the present invention. In this case, in order that the obtained vinyl alcohol polymer compositions have little property unevenness, the modification ratio is desirably not more than 0.1 mole %, more preferably not more than 0.01 mole %, most preferably 0%, (i.e. unmodified). Furthermore, with the vinyl carboxylate polymer used, part of the acyloxy group originating from the vinyl carboxylate unit may have been saponified into hydroxyl groups. In this case, in view of the gas-barrier properties of the resulting vinyl alcohol polymer compositions, the saponification degree of the vinyl carboxylate polymer is preferably not more than 50 mole %, more preferably not more than 10 mole %, most preferably not more than 1 mole %.

The process of the present invention uses a metal alkoxide or oligomers thereof (hereinafter the metal alkoxide or oligomers thereof is sometimes inclusively referred to as "metal alkoxide component"). The metal alkoxide component herein includes at least one member selected from the group consisting of silicone alkoxides, metal alkoxides other than silicone alkoxides, oligomers of metal alkoxides comprising units from silicone alkoxides, and oligomers of metal alkoxides containing no units from silicone alkoxides. In the present invention, it is desirable, but not necessarily limited thereto, to use as at least one component of the metal alkoxide component, a silicone alkoxide or an oligomer of a metal alkoxide comprising units from a silicone alkoxide, which usage insures that the resulting vinyl alcohol polymer compositions have good gas-barrier properties under high humidity, little unevenness in the gas-barrier properties and high mechanical strength.

The above silicone alkoxides preferably have a chemical structure comprising a silicone atom and 2 to 4 alkoxy groups bonded to the silicone atom. The number of the alkoxy groups is preferably 3 or 4, particularly preferably 4. Where the number of alkoxy groups is 2 or 3, the silicone atom is further bonded to an alkyl group (e.g. methyl group), aryl group (e.g. phenyl group), halogen atom (e.g. chlorine atom) or the like. Examples of the alkoxy groups are methoxy, ethoxy, propoxy, isopropoxy and butoxy. Concrete examples of silicone alkoxides are tetramethoxysilane, tetraethoxysilane, methyltrimethoxysilane, ethyltrimethoxysilane, octyltrimethoxysilane, phenyltrimethoxysilane and chlorotrimethoxysilane.

The above metal alkoxides other than silicone alkoxides preferably have a chemical structure comprising a di- or more valent (more preferably tri- or tetravalent) metal atom, e.g. titanium, aluminum and zirconium, and at least one (more preferably at least 2, most preferably at least 3) alkoxy groups bonded to the metal atom. Examples of the alkoxy groups are the same as already given above for silicone alkoxides. The metal atom may be bonded to groups other than alkoxy groups, such as alkyl groups (e.g. methyl group), aryl groups (e.g. phenyl group) and halogen atoms (e.g. chlorine atom). Concrete examples of the metal alkoxides are alkoxy titanium compounds, e.g. tetramethoxytitanium, tetraethoxytitanium, tetraisopropoxytitanium and methyltriisopropoxytitanium; alkoxyaluminums, e.g. trimethoxyaluminum, triethoxyaluminum, triisopropoxyaluminum, methyldiisopropoxyaluminum, tributoxyaluminum and diethoxyaluminum chloride; and alkoxyzirconiums, e.g. tetraethoxyzirconium, tetraisopropoxyzirconium and methyltriisopropoxyzirconium.

The above oligomers of a metal alkoxide comprising units from silicone alkoxides include oligomers of a silicone alkoxide alone and co-oligomers of a silicone alkoxide and another metal alkoxide. The another metal alkoxide preferably has a chemical structure comprising a di- or more (more preferably tri- or tetra-)valent metal atom, such as titanium, aluminum or zirconium and at least one (more preferably at least 2, most preferably at least 3) alkoxy groups bonded to the metal atom. The oligomers of a metal alkoxide comprising units from a silicone alkoxide are preferably those having a low molecular weight and possessing hydroxyl groups, that can be produced by hydrolyzing and polycondensing a silicone alkoxide alone or in combination with another metal alkoxide, by the usual process. Preferred examples of the oligomers of a metal alkoxide comprising units from a silicone alkoxide are dimer or at least trimer of silanol group-containing tetramethoxysilane, dimer or at least trimer of silanol group-containing tetraethoxysilane and terminal-modified oligodimethylsiloxane with silanol group. The degree of polymerization of these oligomers is, not necessarily limited though, preferably in a range of 2 to 25, more preferably in a range of 2 to 10.

The above oligomers of a metal alkoxide comprising no units from silicone alkoxide are desirably low molecular oligomers containing hydroxyl groups, which can be produced by hydrolyzing and polycondensing by the usual method one or at least 2 compounds having a chemical structure comprising a di- or more (more preferably tri- or tetra-)valent metal atom other than silicone atom, e.g. titanium, aluminum and zirconium, and, bonded thereto, at least one (more preferably at least 2, most preferably at least 3) alkoxy groups. Preferred examples of the oligomers of a metal alkoxide comprising no units from a silicone alkoxides are dimer and at least trimer of hydroxyl group-containing tetraisopropoxytitanium. The degree of polymerization of these oligomers is, not necessarily limited though, preferably in a range of 2 to 25, more preferably in a range of 2 to 10.

With the metal alkoxide component used in the process of the present invention, it is desirable, in order for the resulting vinyl alcohol polymer compositions to have good gas-barrier properties, little property unevenness and high mechanical strength, that the content of silicone atom based on the total metal atoms be at least 20 mole %, more preferably at least 50 mole %, most preferably at least 80 mole %.

On effecting the reaction according to the present invention, one may as desired add a metal salt, metal complex or layered clay compound to the reaction zone, within limits not to impair the effect of the present invention. Examples of the metal salt and metal complex are fine particles of metal oxides produced by hydrolyzing and polycondensing by wet process the above metal alkoxides; fine particles of metal oxides produced by hydrolyzing and polycondensing by dry process, or baking, the above metal alkoxides; metal salts of inorganic acids, e.g. carbonate, chloride and nitrate; metal salts of organic acids, e.g. oxalate; metal complexes, e.g. acetylacetonate metal complexes, cyclopentadienyl metal complexes and cyano metal complexes. Examples of the layered clay compound are natural smectite, lyophilic smectite, hydrophilic-treated smectite, natural mica, lyophilic-treated mica and talc.

The known sol-gel process often uses a coupling agent, such as γ-glycidoxypropyltrimethoxysilane, γ-glycidoxypropylmethyldimethoxysilane or γ-aminopropyltrimethoxysilane, in order to increase the dispersibility of the metal oxide in the resulting composition. In contrast, the process of the present invention, using no coupling agent of this type, which would act against improvement of the gas-barrier properties under high-temperature and high-humidity conditions, usually yields better results. Where, however, the above metal salt, metal complex or layered clay compound is used, it becomes sometimes effective, in order to improve the dispersibility thereof, to add a coupling agent. On such occasions, it is desirable to suppress the amount of the coupling agent below 0.1 mole % based on the metal component in the metal alkoxide component used, more preferably not more than 0.01 mole % on the same basis.

The reaction effected in the process of the present invention comprises polycondensation of the above metal alkoxide, in parallel with saponification of the vinyl carboxylate polymer, in the same reaction zone, which is basically known as the in situ sol-gel reaction-saponification. The polycondensation of a metal alkoxide component produces a macromolecular metal oxide. Use of an alkoxide-containing compound such as a metal alkoxide or an alkoxide-containing oligomer permits dehydration-condensation to proceed via hydrolysis that converts the alkoxy group into hydroxyl group. On the other hand, use of a hydroxyl group-containing oligomer often permits only dehydration-condensation to proceed, without going via hydrolysis. Either case can apply to the process of the present invention. The saponification of a vinyl carboxylate polymer produces the corresponding vinyl alcohol polymer. During the saponification, the acyloxy group originating from the vinyl carboxylate unit present in the vinyl carboxylate polymer is converted into hydroxyl group and, at the same time, carboxylic acid-based compounds (usually at least one compound selected from the group consisting of carboxylic acids, carboxylates and carboxylic acid salts, which differ depending on the organic solvent and catalyst used though) are formed. The vinyl alcohol polymer compositions obtained by the reaction according to the present invention are presumed to have chemical bonds between the vinyl alcohol polymer and the metal oxide.

With the reaction according to the present invention, it is necessary to set the amounts used of the vinyl carboxylate polymer and the metal alkoxide component such that the amount of the metal atom contained in the metal alkoxide component is in a range of 0.01 to 100 moles based on 100 moles of the acyl group originating from the vinyl carboxylate unit present in the vinyl carboxylate polymer. Not less than 0.01 mole of the amount of the metal atom in the metal alkoxide based on 100 moles of the acyl group originating from the vinyl carboxylate unit in the vinyl carboxylate polymer insures that the resulting vinyl alcohol polymer compositions have good gas-barrier properties under high-temperature and high-humidity conditions. Not more than 100 moles of the amount of the metal atom in the metal alkoxide based on 100 moles of the acyl group originating from the vinyl carboxylate unit in the vinyl carboxylate polymer insures that the resulting vinyl alcohol polymer compositions have little property unevenness (variation of the gas-barrier properties depending on the spot in the composition) and maintain the gas-barrier properties at high levels even after being repeatedly bent. In order to provide the resulting vinyl alcohol polymer compositions with still better gas-barrier properties under high-temperature and high-humidity conditions, less property unevenness and better maintenance of the gas-barrier properties at high levels even after repeated bending, the amount of the metal atom in the metal alkoxide based on 100 moles of the acyl group originating from the vinyl carboxylate unit in the vinyl carboxylate polymer is preferably in a range of 0.01 to 80 moles, more preferably 0.1 to 60 moles, most preferably 0.01 to 40 moles.

On effecting the reaction according to the present invention, one may use any acid catalyst known for the in situ sol-gel reaction-saponification process, as well as any catalyst known for the usual sol-gel process. Examples of usable catalysts are acidic catalysts, e.g. hydrochloric acid, sulfuric acid, p-toluenesulfonic acid, benzoic acid, acetic acid, lactic acid and carbonic acid; and basic catalysts, e.g. sodium hydroxide, magnesium hydroxide, potassium hydroxide, ammonia, triethylamine and ethylenediamine. These catalysts may be used either singly or in combination. In view of the gas-barrier properties of the resulting vinyl alcohol polymer compositions, it is generally desirable to use an acidic catalyst, more preferably an appropriate combination of an acidic catalyst and a basic catalyst. Where, however, a low molecular hydroxyl group-containing oligomer having been hydrolyzed to some extent or even polycondensed to some extent is used as the metal alkoxide component, it is preferred to use a basic catalyst. The amount of the catalyst used is, not necessarily restricted though, preferably in a range of 0.001 to 0.1 gram-equivalent based on the total moles of the alkoxy group in the metal alkoxide component used and the acyl group originating from the vinyl carboxylate unit in the vinyl carboxylate polymer used, more preferably in a range of 0.01 to 0.05 gram-equivalent on the same basis.

The reaction according to the present invention uses a solution (sol) comprising a vinyl carboxylate polymer and a metal alkoxide component in an organic solvent. Any organic solvent capable of sufficiently dissolving both the vinyl carboxylate polymer and the metal alkoxide component may, with no particular restrictions, be used for this purpose. It is however desirable to use an alcohol, e.g. methanol, ethanol, propanol and butanol; an amide, e.g. dimethylformamide and dimethylacetamide; or a sulfoxide, e.g. dimethyl sulfoxide. These solvents may be used either singly or in combination of 2 or more. Of these, methanol, ethanol and dimethyl sulfoxide are particularly preferred. The amount of the organic solvent used is, not necessarily restricted though, preferably in a range of 20 to 2,000 parts by weight based on 100 parts by weight of the total weight of the metal alkoxide component used and the vinyl carboxylate polymer used, more preferably in a range of 100 to 1,000 parts by weight on the same basis. It is often desired to suppress the remaining ratio of the acyl group in organic polymers (final desired product or intermediates thereof derived by saponification of the vinyl carboxylate polymer), the acyl group originating from the vinyl carboxylate unit of the vinyl carboxylate polymer used. In this case, one may suitably use a homogeneous solvent containing at least 5% by weight of an organic solvent having affinity to the desired vinyl alcohol polymer.

The reaction according to the present invention may be as necessary effected in the presence of water in the reaction mixture. For instance, where an alkoxy group-containing metal alkoxide or an alkoxy group-containing oligomer is used as the metal alkoxide component, presence of water becomes necessary in order to permit the hydrolysis of the alkoxy group to proceed. In this case the amount of water used is not necessarily limited and appropriately set according to the metal alkoxide component used and the type of the catalyst used. In general, the amount of water is preferably in a range of 1.5 to 4.0 times the moles of the alkoxy group present in the metal alkoxide component. Where a catalyst containing water, such as hydrochloric acid, is used, the amount of water to be added should be set while the amount introduced from the catalyst is taken into account.

The reaction according to the present invention is carried out, while at least at a middle stage thereof and afterwards low boiling substances are removed by evaporation or like means from the reaction zone. Such low boiling substances include the solvent, the above-mentioned carboxylic acid-based compounds byproduced by saponification of the vinyl carboxylate polymer used, byproducts formed during polycondensation of the metal alkoxide component (water and the like) and, where an excess amount of water has been added, the excess water.

With the reaction according to the present invention, it is desirable to suppress dissipation of the organic solvent used and the like from the reaction zone at initial stages of the reaction. The initial stages herein mean stages where the remaining ratio, in organic polymers (final desired product or intermediates thereof derived by saponification of the vinyl carboxylate polymer used) generated in the reaction mixture, of the acyl group originating from the vinyl carboxylate unit in the vinyl carboxylate polymer used has not reached 40 mole %. It is also desirable, at the succeeding later stages of reaction, to permit the reaction to proceed while removing the organic solvent and carboxylic acid-based compounds from the reaction zone. For these purposes, it is often desirable to set the reaction pressure at atmospheric pressure or higher in order to suppress evaporation of the organic solvent and the like at the initial stages of reaction, and then change to a reduced pressure so that evaporation of the organic solvent and carboxylic acid-based compounds is accelerated. In the course of the reaction according to the present invention, the reaction mixture is liquid at the initial stages and becomes solid on termination of the reaction.

Where the reaction zone is kept under reduced pressure to remove the carboxylic acid-based compounds and the like, it is desirable to reduce the pressure gradually while observing the condition of the reaction mixture. This is because unnecessarily low pressures sometimes cause the problems of too rapid evaporation of the organic solvent, so that a homogeneous composition cannot be obtained, and of foaming, which makes impossible production of the resulting composition in the desired shape. In view of these, on employment of a reduced pressure, the pressure is desirably selected from a range of 0.01 to 700 mmHg in terms of absolute pressure, more preferably from a range of 0.1 to 400 mmHg in the same term.

With the reaction according to the present invention, it is desirable, in order to maintain the excellent gas-barrier properties of the resulting vinyl alcohol polymer composition at still higher levels even under high-temperature and high-humidity conditions, to permit the reaction to proceed up to a stage where the remaining ratio, in organic polymers contained in the reaction mixture, of the acyl group originating from the vinyl carboxylate unit of the vinyl carboxylate polymer used becomes 10 mole % or below, more preferably 5 mole % or below, still more preferably 1 mole % or below, most preferably 0.1 mole % or below. To achieve such a high degree of reduction of the remaining ratio of the acyl group, it is recommended to employ at least one of the following conditions.

(1) To adjust the amount of the solvent used such that the water content of the reaction mixture becomes not more than 3% by weight, more preferably not more than 1% by weight, most preferably not more than 0.5% by weight;

(2) To adjust the amount of water in the reaction mixture to within the range of 30 to 100 mole %, more preferably within the range of 40 to 75 mole %, based on the alkoxy group originating from the metal alkoxide component; and (3) To use, as the metal alkoxide component, a metal alkoxide or oligomers thereof containing alkoxy group and hydroxyl group in a molar ratio of alkoxy group/hydroxyl group of 1/0.5 to 1/2.0, more preferably 1/0.8 to 1/1.25.

In the present invention, if it is desired to obtain vinyl alcohol polymer compositions having good color tone with no bad colors such as dark brown and black, the following means may, although not limited thereto, be taken. The means comprises permitting the reaction to proceed, while removing, at stages where the remaining ratio, X, of the acyl group originating from the vinyl carboxylate unit present in the vinyl carboxylate polymer in organic polymers (final desired product or its intermediates derived by saponification of the vinyl carboxylate polymer used) contained in the reaction mixture is not more than 40 mole %, the afore-described carboxylic acid-based compounds in such a manner that the following condition is satisfied:

$$Y \leq 0.9X + 5.0 \quad (I)$$

where X denotes the remaining ratio of the acyl group (in mole %) and Y denotes the ratio (in mole %) of the carboxylic acid-based compounds contained in the reaction mixture based on the initial amount of the acyl group originating from the vinyl carboxylate unit in the vinyl carboxylate polymer used. Here, the remaining ratio, X (mole %), of the acyl group contained in organic polymers in the reaction mixture is the ratio of the moles of the acyl group contained in the organic polymers in the reaction mixture to the amount (moles) of the acyl group initially contained in the vinyl carboxylate polymer used, and can be represented by the formula 100–Z, where Z (mole %) represents the degree of saponification of the organic polymers after they have been subjected to only the saponification according to the present invention.

The above formula (I) means, qualitatively, that it becomes necessary, as the reaction proceeds further, to reduce the content of byproduced carboxylic acid-based compounds in the reaction mixture to a lower level, i.e. to remove the carboxylic acid-based compounds in a more strict way. In order to satisfy the formula (I), it is generally desirable, starting at a time midway of the reaction when the remaining ratio, X, of acyl groups contained in organic polymers in the reaction mixture has become 40 mole % or before that time, to monitor the amount of the carboxylic acid-based compounds present in the reaction mixture and permitting the reaction to proceed under a reduced pressure which is controlled based on the monitored value, thereby promoting evaporation of the carboxylic acid-based compounds. On this occasion, carboxylic acid salts contained in the carboxylic acid-based compounds cannot be removed by evaporation. It is therefore desirable to set the reaction conditions such that primarily carboxylic acid and/or carboxylic acid esters are formed and that formation of carboxylic acid salts is suppressed.

The remaining ratio of acyl groups X and the amount of carboxylic acid-based compounds. Y in the above formula (I) can each be determined by quantitative analysis on small amounts of samples taken from the reaction mixture at appropriate times during the reaction. That is, the remaining ratio of acyl groups X may be determined for example in the following manner. A small amount of a sample taken from the reaction mixture which is liquid (sol), gel or solid is rapidly dried under reduced pressure at a temperature of about 40° C., to give a dry composition sample containing organic polymers midway of the reaction. The sample is subjected to quantitative analysis by the diffuse reflection method with FT-IR for the amount of the acyl group (acetyl group, propionyl group or the like). The vinyl carboxylate polymer used is also tested for the amount of the acyl group in the same manner. The ratio between the two amounts is then calculated. The amount of carboxylic acid-based compounds Y may be determined for example in the following manner. A small amount of a sample taken from the reaction mixture which is liquid (sol), gel or solid is dissolved in deuterated methanol and the solution is subjected to quantitative analysis by $^{13}$C-NMR for the amounts of all the acyl groups (acetyl group, propionyl group and the like) contained in organic polymers and byproduced carboxylic acid-based compounds. The ratio (mole %) between the obtained total amount and the amount of the acyl group present in the vinyl carboxylate polymer used, obtained in the same manner, is calculated. The difference between the obtained ratio and the above remaining ratio of acyl group X gives Y.

Where the reaction is conducted such that, in order to obtain vinyl alcohol polymer compositions having good color tone, the above formula (I) is satisfied, it is not always necessary to monitor, at all times during stages where the remaining ratio of the acyl group X is not more than 40%, the remaining ratio of the acyl group X and the amount of the carboxylic acid-based compounds Y. Furthermore, a moment's deviation from the condition satisfying the formula (I) causes no problem. It is therefore practical, as long as the reaction conditions capable of satisfying the formula (I) with a fair margin have been employed, to monitor the two at appropriate time intervals and, when necessary, to control the pressure condition of the reaction zone.

The temperature of the reaction according to the present invention is, not necessarily limited though, generally in a range of 20 to 100° C., preferably in a range of 40 to 60° C. The reaction time, which depends on the amount and type of the catalyst used and like reaction conditions, is generally in a range of 0.5 to 120 hours, preferably in a range of 1 to 60 hours, more preferably in a range of 1 to 24 hours. The atmosphere in the reaction zone may be air, a nitrogen stream or the like with no specific restrictions.

The reaction according to the present invention, which starts with use of a solution (sol) containing a metal alkoxide component, a vinyl carboxylate polymer, an organic solvent and, as necessary, other components (catalyst, water and the like), is conducted, while low boiling substances such as the organic solvent, and carboxylic acid-based compounds are removed from the reaction zone. The conditions of the reaction mixture therefore change with elapse of reaction time. Midway of the reaction, a gel-shaped composition containing the corresponding vinyl alcohol polymer, metal oxide and a small amount of the organic solvent is formed and, at the last stage, a solid composition is formed. The reaction mixture may, when it is in a liquid form, be stirred. The reaction mixture may also be heat treated at late stages and/or after completion of the reaction. In that case, the temperature is preferably in a range of 50 to 250° C., more preferably in a range of 60 to 200° C.

The reaction according to the present invention may, within limits not to impair the effects of the present invention, be effected in the presence of polymers other than the vinyl carboxylate polymer used, a plasticizer, an antioxidant, a UV absorber, a flame retardant and like additives. These additives should be soluble or finely dispersible in the solution initially placed for the reaction. Examples of other polymers are polyamides, polyolefins and styrene-based block copolymers.

With the reaction according to the present invention, the solution at the start or midway of the reaction can be placed in a mold having a prescribed shape, thereby yielding a vinyl alcohol polymer composition having the prescribed shape such as film or sheet. The composition in a gel shape comprising the vinyl alcohol polymer, metal oxide and a small amount of the organic solvent used may be spun by the usual process and the filaments obtained are subjected to further reaction, to give a fiber-form vinyl alcohol polymer composition. Also, a base material comprising fibrous material, such as fabric, may be impregnated with the solution at the start or midway of the reaction and then the reaction is started or continued, whereby a complex comprising the fibrous base material impregnated with the polyvinyl alcohol composition can be produced. The solution may also be applied onto a base having a prescribed shape and comprising a polymer such as polyolefin, e.g. polyethylene and polypropylene; polyester, e.g. polyethylene terephthalate, polybutylene terephthalate and polyethylene naphthalate; polyamide, e.g. nylon 6 and nylon 66; or polyvinyl chloride, and then subjected to the reaction, to give a laminate comprising a layer of the vinyl alcohol polymer composition. In order to form a layer of the solution on the base, any known process including casting, dipping, roll coating, spraying and screen printing can be employed.

The microscopic phase-separation structure possessed by the vinyl alcohol polymer composition obtained by the process of the present invention is, not necessarily limited though, in many cases as follows. That is, the structure comprises the vinyl alcohol polymer formed by saponification of the vinyl carboxylate polymer used and the metal oxide formed by polycondensation of the metal alkoxide component, each co-continuously extending; or comprises a co-continuous structure comprising a sea-islands structure where the sea component is formed by the vinyl alcohol polymer and the islands component are formed by the metal oxide into which the vinyl alcohol polymer has penetrated.

The vinyl alcohol compositions obtained by the process of the present invention have excellent barrier properties against oxygen, water vapor, carbon dioxide, nitrogen and like gases, and can maintain the excellent barrier properties under high-temperature and high-humidity conditions and even after being repeatedly bent. The vinyl alcohol polymer compositions obtained by the process of the present invention are therefore particularly useful as packaging materials such as food-packaging materials, which are required to exhibit good gas-barrier properties being independent of the surrounding conditions including high humidity and maintained even after being repeatedly bent.

Besides, as described above, laminates comprising a coating layer of the vinyl alcohol polymer composition produced by coating a base film with the solution and then effecting the reaction are, being capable of maintaining their excellent gas-barrier properties under high-temperature and high-humidity conditions or after being repeatedly bent, also suitably used as packaging materials, such as food-packaging films.

The present invention is described more concretely with reference to Examples, which are by no means limitative of the invention.

In the Examples and Comparative Examples that follow, the measurements and evaluations were made by the following methods (1) through (6).

(1) Amount of Acyl Group

The vinyl carboxylate polymers (polyvinyl acetate, polyvinyl propionate, ethylene-vinyl acetate copolymer and the like) and the corresponding vinyl alcohol polymers (polyvinyl alcohol, ethylene-vinyl alcohol copolymer and the like) contained in the obtained composition were tested for the amounts of the acyl groups (acetyl group or propionyl group) by the diffuse reflection method with use of FT-IR (FTIR8200, made by Shimadzu Corporation) With respect to acyl group-containing organic polymers midway of the reaction, a small amount of sample was taken from the liquid (sol-like), gel-like or solid reaction mixture, which was rapidly dried under reduced pressure at 40° C. and then subjected to quantitative analysis for the acyl group in the same manner as above. The remaining ratios (unit: mole %) of acyl group of organic polymers midway of the reaction and the final vinyl alcohol polymer were calculated based on the amount of the acyl group determined above.

(2) Amount of Carboxylic Acid-based Compounds

At the same time with sampling for the above acyl group test, a small amount of sample was taken from the liquid (sol-like), gel-like or solid reaction mixture. The sample was dissolved in deuterated methanol and the solution was subjected to quantitative analysis with 100 MHz $^{13}$C-NMR (JNM-LA400/WB, made by JEOL Ltd.) for all the acyl groups (acetyl group, propionyl group and the like) contained in organic polymers and byproduced carboxylic acid-based compounds (acetic acid and its derivatives (esters, salts and the like) or propionic acid and its derivatives). The ratio (mole %) between the thus obtained value and the amount of the acyl group in the vinyl carboxylate polymer used obtained in the same manner was calculated. The difference between the obtained ratio and the above remaining ratio of the acyl group was taken as the amount of the carboxylic acid-based compound (unit: mole %) in the reaction mixture. The ratio by weight (unit: % by weight) between the amount of the carboxylic acid-based compounds and the amount of the vinyl carboxylate polymer used was also determined.

(3) Gas-barrier Properties

Ten sheets of samples were taken from arbitrary positions of a film-shaped composition. The samples were tested with an oxygen transmission rate tester (MOCON OX-TRAN2/20, made by Modern Control Co.) for the oxygen transmission rate (unit: cc·20 $\mu$m/m$^2$·24 hr·atm) under conditions of temperature: 20° C., humidity: 65% RH and oxygen pressure: 2.5 kg/cm$^2$. The minimum value of the obtained ten data was taken as the representative oxygen transmission rate of the sample. Then the same procedure was repeated twice for the ten sheets except that the temperature and humidity were changed to 60° C. and 100% RH, and 90° C. and 100% RH. The minimum values are each taken as the representative oxygen transmission rate under the corresponding condition. The smaller the oxygen transmission rate at 20° C. and 65% RH, the better the gas-barrier properties under the standard condition. The ratio between the oxygen transmission rate at 60° C. and 100% RH or at 90° C. and 100% RH and that at 20° C. and 65% RH is taken as a measure. The smaller and closer to 1 the ratio, the less influenced the gas-barrier properties by humidity and like surrounding conditions.

(4) Property Unevenness

Ten sheets of samples were taken from arbitrary positions of a film-shaped composition. The samples were tested for the oxygen transmission rate (unit: cc·20 $\mu$m/m$^2$·24 hr·atm) with an oxygen transmission rate tester (MOCON OX-TRAN2/20, made by Modern Control Co.) under conditions of temperature: 20° C., humidity: 65% RH and oxygen pressure: 2.5 kg/cm$^2$. Of the obtained 10 data, the best (minimum) oxygen transmission rate was taken as a standard. The number of samples showing an oxygen transmission rate of at least 2 times the standard was counted. The ratio of the obtained number to the total number (10) was taken as "ratio of defective parts". Besides, the ratio between the maximum and minimum transmission rates of the ten values was taken as "property variation". The lower the ratio of defective parts and the smaller and closer to 1 the property variation, the property unevenness is small.

(5) Bending Resistance

Ten sheets of samples having a size of 120 mm×120 mm×0.01 mm were taken from a laminated film (base: an oriented polyethylene terephthalate (PET) film having a thickness of 12 $\mu$, made by Toyobo Co., Ltd.) were each subjected to a repeated bending test in accordance with JIS-P8114 (1998). Thus a pair of blades folding each sample were permitted to repeat 100 times of the motion of going forward and backward at a temperature of 20° C. and a humidity of 65% RH. The samples after the bending test (bent 100 times) were tested for the oxygen transmission rate (unit: cc·20 $\mu m/m^2 \cdot 24$ hr·atm) with an oxygen transmission rate tester (MOCON OX-TRAN2/20, made by Modern Control Co.) under conditions of temperature: 20° C., humidity: 65% RH and oxygen pressure: 2.5 kg/cm$^2$. Of the obtained 10 data, the best (minimum) oxygen transmission rate was taken as a standard. The number of samples showing an oxygen transmission rate of at least 10 times the standard was counted. The smaller the ratio of the obtained number to the total number (10), the better the bending resistance.

In some of the Examples, 20 sheets having the same shape and size were taken from a laminated film. The samples were repeatedly bent by permitting the pair of blades to go forward and backward 10,000 times at a temperature of 20° C. and humidity of 0% RH. Then the samples (bent 10,000 times) were tested for the oxygen transmission rate in same manner as above. The number of samples showing an oxygen transmission rate of at least 10 times the minimum value was counted. The smaller the ratio of the obtained number to the total number (20), the particularly better the bending resistance.

(6) Appearance

A monolayer film-shaped composition sample was visually checked for transparency and color. A colorless transparent sample was judged "good (○)", while an opaque or colored sample was judged "bad (×)".

EXAMPLE 1

There was dissolved 18.5 parts by weight of a polyvinyl acetate having a degree of polymerization of 1,700 in 200 parts by weight of methanol. To the solution, 1.26 parts by weight of tetramethoxysilane, 0.5 part by weight of distilled water and 1.0 part by weight of 1N (normal)-hydrochloric acid were added, to prepare a sol. The sol was subjected to reaction with stirring at 60° C. for 4 hours. The obtained sol was transferred to a flat-bottom polytetrafluoroethylene (TEFLON, made by du Pont Co.) container to a height of 2 mm. The open, top part of the container was sealed with a polyvinylidene chloride film (SARAN WRAP, made by Asahi Chemical Industry Co., Ltd.). The contents were further permitted to continue reaction at 60° C. for 4 hours. Thereafter, the sealing film was perforated with a needle to a perforation ratio by area of 1%. The reaction was then continued again at 60° C. for another 4 hours. When the remaining ratio of the acyl group (remaining ratio of acetyl group in this Example) in organic polymers present in the reaction mixture reached 60 mole %, the reaction zone pressure was changed to a reduced pressure of 100 mmHg, and the reaction was continued at 60° C. while the amount of carboxylic acid-based compounds (acetic acid-based compounds in this Example) present in the reaction mixture was controlled such that the formula (I) was satisfied. After 4 hours, the pressure was changed to 20 mmHg and the reaction was continued at 40° C. for 4 hours.

A colorless transparent monolayer film comprising a polyvinyl alcohol/silica complex was thus obtained.

Separately, part of the sol-like reaction mixture to be transferred to the polytetrafluoroethylene container was taken out and applied on a PET film having a thickness of 12 $\mu$m. The film with the sol was subjected to reaction in the same manner as above, to give a colorless transparent laminated film comprising a layer of the polyvinyl alcohol/silica complex and the PET film.

The monolayer film was tested for the gas-barrier properties and property unevenness and the laminated film for the bending resistance. The results obtained are shown in Table 1, which also shows the amounts of the carboxylic acid-based compounds present in the reaction mixture at stages after the remaining ratio of the acyl group had become not more than 45 mole %, each of the amounts determined successively every time when the remaining ratio reduced by 10 mole %.

EXAMPLES 2 through 5

Example 1 was repeated except that the combination of 18.5 parts by weight of the polyvinyl acetate and 1.26 parts by weight of tetramethoxysilane employed in Example 1 was changed to a combination of 17.5 parts by weight of the polyvinyl acetate and 2.5 parts by weight of tetramethoxysilane (Example 2), a combination of 6.6 parts by weight of the polyvinyl propionte and 7.6 parts by weight of tetramethoxysilane (Example 3), a combination of 14.9 parts by weight of the polyvinyl acetate and 12.6 parts by weight of tetramethoxysilane (Example 4), or a combination of 17.5 parts by weight of the polyvinyl acetate and 3.4 parts by weight of tetraethoxysilane (Example 5), to obtain colorless transparent monolayer films comprising a polyvinyl alcohol/silica complex and colorless transparent laminated films comprising a layer of the same complex and the PET film. The time rate of change of the amount of the carboxylic acid-based compounds in the reaction mixture in each of the Examples was as shown in Table 1.

The monolayer films and the laminated films were tested for the gas-barrier properties, property unevenness and bending resistance in the prescribed manner. The results are also shown in Table 1.

EXAMPLE 6

There was dissolved 17.5 parts by weight of a polyvinyl acetate having a degree of polymerization of 1,700 in 200 parts by weight of methanol. To the solution, 2.28 parts by weight of tetramethoxysilane, 0.35 part by weight of tetraisopropoxytitanium and 1.0 part by weight of 1N (normal)-hydrochloric acid were added under an atmosphere of nitrogen, to prepare a sol. The sol was subjected to reaction with stirring at 60° C. for 4 hours. The obtained sol was transferred to a flat-bottom polytetrafluoroethylene (TEFLON, made by du Pont Co.) container to a height of 2 mm. The open, top part of the container was sealed with a polyvinylidene chloride film (SARAN WRAP, made by Asahi Chemical Industry Co., Ltd.). The contents were further permitted to continue reaction at 60° C. for 4 hours. Thereafter, the sealing film was removed and the reaction was continued again at 60° C. for 4 hours. When the remaining ratio of the acyl group (remaining ratio of acetyl group in this Example) in organic polymers present in the reaction mixture reached 60 mole %, the reaction zone pressure was changed to a reduced pressure of 100 mmHg, and the reaction was continued at 60° C. while the amount of carboxylic acid-based compounds (acetic acid-based compounds in this Example) present in the reaction mixture was controlled such that the formula (I) was satisfied. After 4 hours, the pressure was changed to 20 mmHg and the reaction was continued at 40° C. for 4 hours.

A colorless transparent monolayer film comprising a polyvinyl alcohol/silica-titania complex was thus obtained.

Separately, part of the sol-like reaction mixture to be transferred to the polytetrafluoroethylene container was taken out and applied on a PET film having a thickness of 12 μm. The film with the sol was subjected to reaction in the same manner as above, to give a colorless transparent laminated film comprising a layer of the polyvinyl alcohol/silica-titania complex and the PET film.

The monolayer film was tested for the gas-barrier properties and property unevenness and the laminated film for the bending resistance in the prescribed manner.

The monolayer film and the laminated film were tested for the gas-barrier properties, property unevenness and bending resistance in the prescribed manner. The results obtained are shown in Table 1, which also shows the amounts of the carboxylic acid-based compounds present in the reaction mixture at stages after the remaining ratio of the acyl group had become not more than 45 mole %, each of the amounts determined successively when the remaining ratio reduced by 10 mole %.

EXAMPLE 7

Example 6 was repeated except that the combination of 2.28 parts by weight of tetramethoxysilane and 0.35 part by weight of tetraisopropoxytitanium was changed to a combination of 3.29 parts by weight of tetramethoxysilane and 0.20 part by weight of triisopropoxyaluminum, to obtain a colorless transparent monolayer film comprising a polyvinyl alcohol/silica-alumina complex and a colorless transparent laminated film comprising a layer of the polyvinyl alcohol/silica-alumina complex and the PET film. The rate of change of the amount of the carboxylic acid-based compounds in the reaction mixture was as shown in Table 1.

The monolayer film and the laminated film were tested for the gas-barrier properties, property unevenness and bending resistance in the prescribed manner. The results are also shown in Table 1.

EXAMPLE 8

Example 6 was repeated except that the combination of 2.28 parts by weight of tetramethoxysilane and 0.35 part by weight of tetraisopropoxytitanium was changed to a combination of 3.29 parts by weight of tetramethoxysilane and 0.13 part by weight of tetraisopropoxyzirconium, to obtain a colorless transparent monolayer film comprising a polyvinyl alcohol/silica-zirconia complex and a colorless transparent laminated film comprising a layer of the polyvinyl alcohol/silica-zirconia complex and the PET film. The rate of change of the amount of the carboxylic acid-based compounds in the reaction mixture was as shown in Table 1.

The monolayer film and the laminated film were tested for the gas-barrier properties, property unevenness and bending resistance in the prescribed manner. The results are also shown in Table 1.

TABLE 1

| Example | | | Example 1 | Example 2 | Example 3 | Example 4 | Example 5 | Example 6 | Example 7 | Example 8 |
|---|---|---|---|---|---|---|---|---|---|---|
| Vinyl carboxylate polymer used (parts by weight) | | | 18.5 | 17.5 | 6.6 | 14.9 | 17.5 | 17.5 | 17.5 | 17.5 |
| Silicone alkoxide used (parts by weight) | | | $Si(OMe)_4$ 1.26 | $Si(OMe)_4$ 2.5 | $Si(OMe)_4$ 7.6 | $Si(OMe)_4$ 12.6 | $Si(OEt)_4$ 3.4 | $Si(OMe)_4$ 2.28 | $Si(OMe)_4$ 3.29 | $Si(OMe)_4$ 3.29 |
| Other metal alkoxide used (parts by weight) | | | — | — | — | — | — | $Ti(OiPr)_4$ 0.35 | $Al(OiPr)_4$ 0.20 | $Zr(OiPr)_4$ 0.13 |
| Ratio of metal alkoxide component | | | 3.9 | 8.1 | 75 | 85 | 8.0 | 8.0 | 11 | 11 |
| Amount of carboxylic acid-based compounds (mole %) | Remaining ratio of acyl group (mole %) | 45 | 44 | 42 | 38 | 40 | 42 | 42 | 42 | 42 |
| | | 35 | 32 | 30 | 28 | 30 | 30 | 30 | 30 | 30 |
| | | 25 | 22 | 20 | 18 | 20 | 20 | 20 | 18 | 18 |
| | | 15 | 12 | 8 | 8 | 10 | 8 | 6 | 6 | 6 |
| | | 5 | — | 2 | 2 | 2 | 2 | 1 | 1 | 1 |
| Remaining ratio of acyl group in the composition (mole %) | | | 5 | <1 | <1 | <1 | <1 | <1 | <1 | <1 |
| Gas-barrier properties | | | | | | | | | | |
| 20° C., 65% RH [cc · 20 μm/m² · 24 hr · atm] | | | <0.1 | <0.1 | <0.1 | <0.1 | <0.1 | <0.1 | <0.1 | <0.1 |
| (60° C., 100% RH)/(20° C., 65% RH) | | | 1.5 | 1.5 | 1.5 | 1.5 | 1.5 | 1.6 | 1.8 | 1.8 |
| (90° C., 100% RH)/(20° C., 65% RH) | | | 4.0 | 3.5 | 3.5 | 3.5 | 3.5 | 4.0 | 4.0 | 4.0 |
| Property unevenness (ratio of defective parts) | | | 0/10 | 0/10 | 0/10 | 0/10 | 0/10 | 0/10 | 0/10 | 0/10 |
| Property unevenness (property variation) | | | <2 | <2 | <2 | <2 | <2 | <2 | <2 | <2 |
| Bending resistance | | | | | | | | | | |
| (bent 100 times) | | | 0/10 | 0/10 | 0/10 | 0/10 | 0/10 | 0/10 | 0/10 | 0/10 |
| (bent 10,000 times) | | | 0/20 | 0/20 | 1/20 | 5/20 | 0/20 | 0/20 | 0/20 | 0/20 |
| Appearance | | | ○ | ○ | ○ | ○ | ○ | ○ | ○ | ○ |

In Table 1, "Ratio of metal alkoxide component" means the moles of the metal atom contained in the metal alkoxide used, such as silicone alkoxide or the like or its oligomer, based on 100 moles of the acyl group originating from the vinyl carboxylate unit contained in the vinyl carboxylate polymer used. "Amount of carboxylic acid-based compounds" means the molar ratio of byproduced carboxylic acid-based compounds present in the reaction mixture, based on the moles of the acyl group initially present in the vinyl carboxylate polymer used. "Remaining ratio of acyl group" means the molar ratio of the amount of the acyl group remaining in organic polymers in the reaction mixture or remaining in the vinyl alcohol polymer in the finally obtained composition, based on the moles of the acyl group contained in the vinyl carboxylate polymer used. In the item of gas-barrier properties, the column "20° C., 65% RH" shows the oxygen transmission rates at a temperature of 20° C. and a humidity of 65% RH in cc·20 μm/m²·24 hr·atm; and the columns "(60° C., 100% RH)/(20° C., 65% RH)" and "(90° C., 100% RH)/(20° C., 65% RH)" show the ratios of, respectively, the oxygen transmission rates at a temperature of 60° C. and a humidity of 100% RH and that at a temperature of 90° C. and a humidity of 100% RH to that at a temperature of 20° C. and a humidity of 65% RH.

EXAMPLE 9

There was dissolved 16.5 parts by weight of an ethylene-vinyl acetate copolymer having a degree of polymerization of 1,000 and an ethylene content of 32 mole % in 200 parts by weight of methanol. To the solution, 1.26 parts by weight of tetramethoxysilane, 0.5 part by weight of distilled water and 1.0 part by weight of 1N-hydrochloric acid were added, to prepare a sol. The sol was subjected to reaction with stirring at 60° C. for 4 hours. The obtained sol was transferred to a flat-bottom polytetrafluoroethylene (TEFLON, made by du Pont Co.) container to a height of 2 mm. The open, top part of the container was sealed with a polyvinylidene chloride film (SARAN WRAP, made by Asahi Chemical Industry Co., Ltd.). The contents were further permitted to continue reaction at 60° C. for 4 hours. Thereafter, the sealing film was perforated with a needle to a perforation ratio by area of 1%. The reaction was then continued again at 60° C. for another 4 hours. When the remaining ratio of the acyl group (remaining ratio of acetyl group) in this Example) in organic polymers present in the reaction mixture reached 60 mole %, the reaction zone pressure was changed to a reduced pressure of 100 mmHg, and the reaction was continued at 60° C. while the amount of carboxylic acid-based compounds (acetic acid-based compounds in this Example) present in the reaction mixture was controlled such that the formula (I) was satisfied. After 4 hours, the pressure was changed to 20 mmHg and the reaction was continued at 40° C. for 4 hours.

A colorless transparent monolayer film comprising an ethylene-vinyl alcohol copolymer/silica complex was thus obtained.

Separately, part of the sol-like reaction mixture to be transferred to the polytetrafluoroethylene container was taken out and applied on a PET film having a thickness of 12 μm. The film with the sol was subjected to reaction in the same manner as above, to give a colorless transparent laminated film comprising a layer of the ethylene-vinyl alcohol copolymer/silica complex and the PET film.

The monolayer film and the laminated film were tested for the gas-barrier properties, property unevenness and bending resistance in the prescribed manner. The results obtained are shown in Table 2, which also shows the amounts of the carboxylic acid-based compounds present in the reaction mixture at stages after the remaining ratio of the acyl group had become not more than 45 mole %, each of the amounts determined successively every time when the remaining ratio reduced by 10 mole %.

EXAMPLES 10 THROUGH 13

Example 9 was repeated except that the combination of 16.5 parts by weight of the ethylene-vinyl acetate copolymer having an ethylene content of 32 mole % and 1.26 parts by weight of tetramethoxysilane employed in Example 9 was changed to a combination of 15.6 parts by weight of the ethylene-vinyl acetate copolymer having an ethylene content of 32 mole % and 2.5 parts by weight of tetramethoxysilane (Example 10), a combination of 11.4 parts by weight of an ethylene-vinyl acetate copolymer having an ethylene content of 44 mole % and 7.6 parts by weight of tetramethoxysilane (Example 11), a combination of 4.68 parts by weight of the ethylene-vinyl acetate copolymer having an ethylene content of 44 mole % and 10.6 parts by weight of tetramethoxysilane (Example 12), or a combination of 15.6 parts by weight of the ethylene-vinyl acetate copolymer having an ethylene content of 32 mole % and 3.4 parts by weight of tetraethoxysilane (Example 13), to obtain colorless transparent monolayer films comprising an ethylene-vinyl alcohol copolymer/silica complex and colorless transparent laminated films comprising a layer of the same complex and the PET film. The rate of change of the amount of the carboxylic acid-based compounds in the reaction mixture in each of the Examples was as shown in Table 2.

The monolayer films and the laminated films were tested for the gas-barrier properties, property unevenness and bending resistance in the prescribed manner. The results are also shown in Table 2.

EXAMPLE 14

There was dissolved 15.6 parts by weight of an ethylene-vinyl acetate copolymer having a degree of polymerization of 750 and an ethylene content of 32 mole % in 200 parts by weight of methanol. To the solution, 2.28 parts by weight of tetramethoxysilane, 0.35 part by weight of tetraisopropoxytitanium and 1.0 part by weight of 1N-hydrochloric acid were added under an atmosphere of nitrogen, to prepare a sol. The sol was subjected to reaction with stirring at 60° C. for 4 hours. The obtained sol was transferred to a flat-bottom polytetrafluoroethylene (TEFLON, made by du Pont Co.) container to a height of 2 mm. The open, top part of the container was sealed with a polyvinylidene chloride film (SARAN WRAP, made by Asahi Chemical Industry Co., Ltd.). The contents were further permitted to continue reaction at 60° C. for 4 hours. Thereafter, the sealing film was removed and the reaction was continued again at 60° C. for another 4 hours. When the remaining ratio of the acyl group (remaining ratio of acetyl group in this Example) in organic polymers present in the reaction mixture reached 60 mole %, the reaction zone pressure was changed to a reduced pressure of 100 mmHg, and the reaction was continued at 60° C. while the amount of carboxylic acid-based compounds (acetic acid-based compounds in this Example) present in the reaction mixture was controlled such that the formula (I) was satisfied. After 4 hours, the pressure was changed to 20 mmHg and the reaction was continued at 40° C. for 4 hours.

A colorless transparent monolayer film comprising an ethylene-vinyl alcohol copolymer/silica-titania complex was thus obtained.

Separately, part of the sol-like reaction mixture to be transferred to the polytetrafluoroethylene container was taken out and applied on a PET film having a thickness of 12 μm. The film with the sol was subjected to reaction in the same manner as above, to give a colorless transparent laminated film comprising a layer of the ethylene-vinyl alcohol copolymer/silica-titania complex and the PET film.

The monolayer film and laminated film were tested for the gas-barrier properties, property unevenness and bending resistance in the prescribed manner. The results obtained are shown in Table 2, which also shows the amounts of the carboxylic acid-based compounds present in the reaction mixture at stages after the remaining ratio of the acyl group had become not more than 45 mole %, each of the amounts determined successively every time when the remaining ratio reduced by 10 mole %.

EXAMPLES 15 AND 16

Example 14 was repeated except that the combination of 2.28 parts by weight of tetramethoxysilane and 0.35 part by weight of tetraisopropoxytitanium employed in Example 14 was changed to a combination of 2.02 parts by weight of tetramethoxysilane and 0.71 part by weight of tetraisopropoxytitanium (Example 15) or a combination of 1.77 parts by weight of tetramethoxysilane and 1.06 part by weight of tetraisopropoxytitanium (Example 16), to obtain colorless transparent monolayer films comprising an ethylene-vinyl alcohol copolymer/silica-titania complex and colorless transparent laminated films comprising a layer of the same complex and the PET film. The time rate of change of the amount of the carboxylic acid-based compounds in the reaction mixture in each of the Examples was as shown in Table 2.

The monolayer films and the laminated films were tested for the gas-barrier properties, property unevenness and bending resistance in the prescribed manner. The results are also shown in Table 2.

In Table 2, "Ratio of metal alkoxide component", "Amount of carboxylic acid-based compounds", "Remaining ratio of acyl group", "20° C., 65% RH", "(60° C., 100% RH)/(20° C., 65% RH)" and "(90° C., 100% RH)/(20° C., 65% RH)" are the same as explained for Table 1.

EXAMPLE 17

Example 2 was repeated except that a mixture of 8.8 parts by weight of the polyvinyl acetate having a degree of polymerization of 2,200 and 7.8 parts by weight of an ethylene-vinyl acetate copolymer having a degree of polymerization of 750 and an ethylene content of 32 mole % was used instead of 17.5 parts by weight of the polyvinyl acetate having a degree of polymerization of 1,700, to obtain colorless transparent monolayer films comprising a vinyl alcohol polymer(a mixture of a polyvinyl alcohol and an ethylene-vinyl alcohol copolymer)/silica complex and colorless transparent laminated films comprising a layer of the same complex and the PET film. The time rate of change of the amount of the carboxylic acid-based compounds in the reaction mixture was as shown in Table 3.

The monolayer film and the laminated film were tested for the gas-barrier properties, property unevenness and bending resistance in the prescribed manner. The results are also shown in Table 3.

Comparative Example 1

A monolayer film was formed from a polyvinyl alcohol (PVA117, made by Kuraray Co., Ltd.) and tested for the gas-barrier properties, property unevenness and appearance.

TABLE 2

| Example | Example 9 | Example 10 | Example 11 | Example 12 | Example 13 | Example 14 | Example 15 | Example 16 |
|---|---|---|---|---|---|---|---|---|
| Vinyl carboxylate polymer used (parts by weight) | 16.5 | 15.6 | 11.4 | 4.68 | 15.6 | 15.6 | 15.6 | 15.6 |
| Silicone alkoxide used | Si(OMe)$_4$ | Si(OMe)$_4$ | Si(OMe)$_4$ | Si(OMe)$_4$ | Si(OEt)$_4$ | Si(OMe)$_4$ | Si(OMe)$_4$ | Si(OMe)$_4$ |
| (parts by weight) | 1.26 | 2.5 | 7.6 | 10.6 | 3.4 | 2.28 | 2.02 | 1.77 |
| Other metal alkoxide used | — | — | — | — | — | Ti(OiPr)$_4$ | Al(OiPr)$_4$ | Zr(OiPr)$_4$ |
| (parts by weight) | | | | | | 0.35 | 0.71 | 1.06 |
| Ratio of metal alkoxide component | 3.4 | 7.1 | 27 | 90 | 7.1 | 7.0 | 6.8 | 6.6 |
| Amount of carboxylic acid-based compounds (mole %) — Remaining ratio of acyl group (mole %) 45 | 45 | 44 | 42 | 38 | 40 | 42 | 42 | 42 | 42 |
| 35 | 35 | 32 | 30 | 28 | 30 | 30 | 30 | 30 | 30 |
| 25 | 25 | 22 | 20 | 18 | 20 | 20 | 20 | 18 | 18 |
| 15 | 15 | 12 | 8 | 8 | 10 | 8 | 6 | 6 | 6 |
| 5 | 5 | — | 2 | 2 | 2 | 2 | 1 | 1 | 1 |
| Remaining ratio of acyl group in the composition (mole %) | 5 | <1 | <1 | <1 | <1 | <1 | <1 | <1 |
| Gas-barrier properties | | | | | | | | |
| 20° C., 65% RH [cc · 20 μm/m$^2$ · 24 hr · atm] | 1.0 | 0.5 | 1.5 | 1.5 | 0.5 | 0.5 | 0.5 | 0.5 |
| (60° C., 100% RH)/(20° C., 65% RH) | 1.2 | 1.1 | 1.1 | 1.1 | 1.1 | 1.2 | 1.2 | 1.4 |
| (90° C., 100% RH)/(20° C., 65% RH) | 2.2 | 2.0 | 2.0 | 2.0 | 2.0 | 2.2 | 2.4 | 2.4 |
| Property unevenness (ratio of defective parts) | 0/10 | 0/10 | 0/10 | 0/10 | 0/10 | 0/10 | 0/10 | 0/10 |
| Property unevenness (property variation) | <2 | <2 | <2 | <2 | <2 | <2 | <2 | <2 |
| Bending resistance | | | | | | | | |
| (bent 100 times) | 0/10 | 0/10 | 0/10 | 0/10 | 0/10 | 0/10 | 0/10 | 0/10 |
| (bent 10,000 times) | 0/20 | 0/20 | 0/20 | 6/20 | 0/20 | 0/20 | 0/20 | 0/20 |
| Appearance | ◯ | ◯ | ◯ | ◯ | ◯ | ◯ | ◯ | ◯ |

Separately, an aqueous solution of the polyvinyl alcohol was applied on a PET film having a thickness of 12 μm and dried, to give a laminated film, which was then tested for the bending resistance.

The results obtained are shown in Table 3.

Comparative Example 2

A monolayer film was formed from an ethylene-vinyl alcohol copolymer (EVAL EP-F101, made by Kuraray Co., Ltd.) and tested for the gas-barrier properties, property unevenness and appearance.

Separately, a solution of the ethylene-vinyl alcohol copolymer in a water/propyl alcohol mixed solvent was applied on a PET film having a thickness of 12 μm and dried, to give a laminated film, which was then tested for the bending resistance.

The results obtained are shown in Table 3.

Comparative Example 3

Example 2 was repeated (only polycondensation of tetramethoxysilane in this Example) except that 9.0 parts by weight of a polyvinyl alcohol (PVA117, made by Kuraray Co., Ltd.) was used instead of 17.5 parts by weight of the polyvinyl acetate, to obtain a colorless transparent monolayer film comprising a polyvinyl alcohol/silica complex and a colorless transparent laminated film comprising a layer of the same complex and the PET film. The monolayer film and the laminated film thus obtained were tested for the gas-barrier properties, property unevenness, bending resistance and appearance in the prescribed manner. The results are shown in Table 3.

Comparative Example 4

Example 10 was repeated (only polycondensation of tetramethoxysilane in this Example) except that 9.0 parts by weight of an ethylene-vinyl alcohol copolymer (EVAL EP-F101, made by Kuraray Co., Ltd.) was used instead of 15.6 parts by weight of the polyvinyl acetate, to obtain a colorless transparent monolayer film comprising an ethylene-vinyl alcohol copolymer/silica complex and a colorless transparent laminated film comprising a layer of the same complex and the PET film. The monolayer film and the laminated film thus obtained were tested for the gas-barrier properties, property unevenness, bending resistance and appearance in the prescribed manner. The results are shown in Table 3.

Comparative Example 5

In a flat-bottom polypropylene container, 1.0 part by weight of polyvinyl acetate was dissolved in 20 parts by weight of methanol. To the solution, 2.0 parts by weight of tetramethoxysilane and 1.60 parts by weight of 0.1N-hydrochloric acid were added under an atmosphere of nitrogen, to prepare a sol. The open, top part of the container was sealed with an aluminum foil having a perforation ratio of 1%. The contents were heated at a rate of 10° C./hr up to 60° C. and then permitted, as they were, to continue reaction for 168 hours, to give a brown monolayer film comprising a polyvinyl alcohol (remaining ratio of acetyl group: 15 mole %)/silica complex.

Separately, part of the sol-like reaction mixture was taken out and applied on a PET film having a thickness of 12 μm. The film with the sol was subjected to reaction in the same manner as above, to give a laminated film comprising a layer of the polyvinyl alcohol/silica complex and the PET film.

The time rate of change of the amount of carboxylic acid-based compounds during the reaction and the results of evaluation on the obtained monolayer film and laminated film, for the gas-barrier properties, property unevenness and bending resistance are shown in Table 3.

TABLE 3

| Example/Comparative Example | | | Example 17 | Comparative Example 1 | Comparative Example 2 | Comparative Example 3 | Comparative Example 4 | Comparative Example 5 |
|---|---|---|---|---|---|---|---|---|
| Vinyl carboxylate polymer used (parts by weight) | | | PVAc/EVAc 8.8/7.8 | PVA | EVOH | PVA | EVOH | PVAC 1.0 |
| Silicone alkoxide used (parts by weight) | | | $Si(OMe)_4$ 2.5 | — | — | $Si(OMe)_4$ | $Si(OMe)_4$ | $Si(OMe)_4$ 2.0 |
| Ratio of metal alkoxide component | | | 7.5 | — | — | — | — | 113 |
| Amount of carboxylic acid-based compounds (mole %) | Remaining ratio of acyl group (mole %) | 45 | 42 | — | — | — | — | 50 |
| | | 35 | 30 | — | — | — | — | 52 |
| | | 25 | 20 | — | — | — | — | 55 |
| | | 15 | 8 | — | — | — | — | — |
| | | 5 | 2 | — | — | — | — | — |
| Remaining ratio of acyl group in the composition (mole %) | | | <1 | <1 | <1 | <1 | <1 | 15 |
| Gas-barrier properties | | | | | | | | |
| 20° C., 65% RH (cc · 20 μm/m² · 24 hr · atm] | | | 1.0 | <0.1 | 0.5 | 0.1 | 2.0 | 0.1 |
| (60° C., 100% RH)/(20° C., 65% RH) | | | 1.5 | >100 | >100 | 10 | 10 | 1.5 |
| (90° C., 100% RH)/(20° C., 65% RH) | | | 3.0 | >100 | >100 | 50 | 40 | 3.5 |
| Property unevenness (ratio of defective parts) | | | 0/10 | 0/10 | 0/10 | 4/10 | 6/10 | 0/10 |
| Property unevenness (property variation) | | | <2 | <2 | <2 | 2.5 | 4 | 2.5 |
| Bending resistance (bent 100 times) | | | 0/10 | 2/10 | 1/10 | 2/10 | 1/10 | 6/10 |
| Appearance | | | ◯ | ◯ | ◯ | ◯ | ◯ | X |

In Table 3, "Ratio of metal alkoxide component", "Amount of carboxylic acid-based compounds", "Remaining ratio of acyl group", "20° C., 65% RH", "(60° C., 100% RH)/(20° C., 65% RH)" and "(90° C., 100% RH)/(20° C., 65% RH)" are the same as explained for Table 1. In the Table, "PVAc", "PVA", "EVAc" and "EVOH" "represent polyvinyl acetate", "polyvinyl alcohol", "ethylene-vinyl acetate copolymer" and "ethylene-vinyl alcohol copolymer", respectively.

EXAMPLE 18

Example 2 was repeated except that 0.5 part by weight of distilled water was not added, to obtain a colorless transparent monolayer film comprising a polyvinyl alcohol/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 4.

EXAMPLE 19

Example 2 was repeated except that the amount added of 1N-hydrochloric acid was changed from 1.0 part by weight to 0.1 part by weight, to obtain a colorless transparent monolayer film comprising a polyvinyl alcohol/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 4.

EXAMPLE 20

Example 2 was repeated except that 0.6 part by weight of acetic acid was used instead of 1.0 part by weight of 1N-hydrochloric acid, to obtain a colorless transparent monolayer film comprising a polyvinyl alcohol/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 4.

EXAMPLE 21

Example 2 was repeated except that the amount added of 1N-hydrochloric acid was changed from 1.0 part by weight to 0.1 part by weight and that 0.1 part by weight of triethylamine was added before the transfer of the sol to the polytetrafluoroethylene container and dissolved completely, to obtain a colorless transparent monolayer film comprising a polyvinyl alcohol/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 4.

EXAMPLEs 22 AND 23

Example 2 was repeated except that, instead of the polyvinyl acetate having a degree of polymerization of 1,700, a polyvinyl acetate having a degree of polymerization of 500 (Example 22) or one having a degree of polymerization of 4,000 (Example 23) was used, to obtain colorless transparent monolayer films comprising a polyvinyl alcohol/silica complex and colorless transparent laminated films comprising a layer of the same complex and the PET film.

The time rate of change of the amount of the carboxylic acid-based compounds in the reaction mixture during the reaction and the results of evaluation on the obtained monolayer films and laminated films, for the gas-barrier properties, property unevenness and bending resistance are shown in Table 4.

EXAMPLE 24

Example 10 was repeated except that 0.5 part by weight of distilled water was not added, to obtain a colorless transparent monolayer film comprising an ethylene-vinyl alcohol copolymer/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 4.

EXAMPLE 25

Example 10 was repeated except that the amount used of 1N-hydrochloric acid was changed from 1.0 part by weight to 0.1 part by weight, to obtain a colorless transparent monolayer film comprising an ethylene-vinyl alcohol copolymer/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 4.

EXAMPLE 26

Example 10 was repeated except that 0.6 part by weight of acetic acid was used instead of 1.0 part by weight of 1N-hydrochloric acid, to obtain a colorless transparent monolayer film comprising an ethylene-vinyl alcohol copolymer/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 4.

EXAMPLE 27

Example 10 was repeated except that the amount used of 1N-hydrochloric acid was changed from 1.0 part by weight to 0.1 part by weight and that 0.1 part by weight of triethylamine was added before the transfer of the sol to the polytetrafluoroethylene container and dissolved completely, to obtain a colorless transparent monolayer film comprising an ethylene-vinyl alcohol copolymer/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 4.

degree of polymerization of 1,700, to obtain a colorless transparent monolayer film comprising a polyvinyl alcohol/silica complex and a colorless transparent laminated film comprising a layer of the same complex and the PET film.

The time rate of change of the amount of the carboxylic acid-based compounds in the reaction mixture during the reaction and the results of evaluation on the obtained mono-

TABLE 4

| Example | | | Example 18 | Example 19 | Example 20 | Example 21 | Example 22 | Example 23 | Example 24 | Example 25 | Example 26 | Example 27 |
|---|---|---|---|---|---|---|---|---|---|---|---|---|
| Ratio of metal alkoxide component | | | 8.1 | 6.1 | 8.1 | 8.1 | 6.1 | 8.1 | 6.1 | 8.1 | 6.1 | 8.1 |
| Amount of carboxylic acid-based compounds (mole %) | Remaining ratio of acyl group (mole %) | 45 | 42 | 42 | 42 | 42 | 42 | 42 | 42 | 42 | 42 | 42 |
| | | 35 | 30 | 30 | 30 | 30 | 30 | 30 | 30 | 30 | 30 | 30 |
| | | 25 | 20 | 20 | 20 | 20 | 20 | 20 | 20 | 20 | 20 | 20 |
| | | 15 | 6 | 6 | 6 | 8 | 8 | 6 | 6 | 6 | 8 | 8 |
| | | 5 | 2 | 2 | 2 | 2 | 2 | 2 | 2 | 2 | 2 | 2 |
| Remaining ratio of acyl group in the composition (mole %) | | | <1 | <1 | <1 | <1 | <1 | <1 | <1 | <1 | <1 | <1 |
| Gas-barrier properties | | | | | | | | | | | | |
| 20° C., 65% RH [cc · 20 μm/m² · 24 hr · atm] | | | <0.1 | <0.1 | <0.1 | <0.1 | <0.1 | <0.1 | 0.5 | 0.5 | 0.5 | 0.5 |
| (60° C., 100% RH)/(20° C., 65% RH) | | | 1.5 | 1.5 | 1.5 | 1.2 | 1.5 | 1.5 | 1.1 | 1.2 | 1.1 | 1.0 |
| (90° C., 100% RH)/(20° C., 65% RH) | | | 3.5 | 4.0 | 3.5 | 3.0 | 3.5 | 4.0 | 2.0 | 2.2 | 2.0 | 1.8 |
| Property unevenness (ratio of defective parts) | | | 0/10 | 0/10 | 0/10 | 0/10 | 0/10 | 0/10 | 0/10 | 0/10 | 0/10 | 0/10 |
| Property unevenness (property variation) | | | <2 | <2 | <2 | <2 | <2 | <2 | <2 | <2 | <2 | <2 |
| Bending resistance (bent 100 times) | | | 0/10 | 0/10 | 0/10 | 0/10 | 0/10 | 0/10 | 0/10 | 0/10 | 0/10 | 0/10 |
| Appearance | | | ○ | ○ | ○ | ○ | ○ | ○ | ○ | ○ | ○ | ○ |

In Table 4, "Ratio of metal alkoxide component", "Amount of carboxylic acid-based compounds", "Remaining ratio of acyl group", "20° C., 65% RH", "(60° C., 100% RH)/(20° C., 65% RH)" and "(90° C., 100% RH)/(20° C., 65% RH)" are the same as explained for Table 1.

EXAMPLE 28

Example 2 was repeated except that 17.0 part by weight of a partially saponified (degree of saponification: 10 mole %) polyvinyl acetate having a degree of polymerization of 1,700 was used instead of 17.5 part by weight of the polyvinyl acetate having a degree of polymerization of 1,700, to obtain a colorless transparent monolayer film comprising a polyvinyl alcohol/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 5.

EXAMPLE 29

Example 2 was repeated except that a mixture of 15.8 parts by weight of a polyvinyl acetate having a degree of polymerization of 1,700 and 0.9 part by weight of a polyvinyl alcohol having a degree of polymerization of 1,700 (degree of saponification: 99.95 mole %) was used instead of 17.5 part by weight of the polyvinyl acetate having a layer film and laminated film, for the gas-barrier properties, property unevenness and bending resistance are shown in Table 5.

EXAMPLE 30

Example 10 was repeated except that 14.9 parts by weight of a partially saponified(degree of saponification: 10 mole %) ethylene-vinyl acetate copolymer having an ethylene content of 32 mole % was used instead of 15.6 parts by weight of the ethylene-vinyl acetate copolymer having an ethylene content of 32 mole %, to obtain a colorless transparent monolayer film comprising an ethylene-vinyl alcohol copolymer/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 5.

EXAMPLE 31

Example 10 was repeated except that a mixture of 14.0 parts by weight of an ethylene-vinyl acetate copolymer having an ethylene content of 32 mole % and 0.9 part by weight of an ethylene-vinyl alcohol copolymer having an ethylene content of 32 mole % (degree of saponification: 99.95 mole %) (the apparent degree of saponification of the mixture: 10 mole %) was used instead of 15.6 parts by weight of the ethylene-vinyl acetate copolymer having an ethylene content of 32 mole %, to obtain a colorless transparent monolayer film comprising an ethylene-vinyl alcohol copolymer/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 5.

γ-glycidoxypropyltrimethoxysilane was used instead of 2.5 parts by weight of tetramethoxysilane, to obtain a colorless transparent monolayer film comprising a polyvinyl alcohol/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 5.

TABLE 5

| Example | | Example 28 | Example 29 | Example 30 | Example 31 | Example 32 | Example 33 |
|---|---|---|---|---|---|---|---|
| Starting materials for composition | | | | | | | |
| Vinyl alcohol polymer or its precursor used (parts by weight) | | PVAc 17.0 | PVA/PVAc 0.9/15.8 | EVAc 14.9 | EVOH/EVAc 0.9/14.0 | PVAc 17.5 | PVAc 17.5 |
| [Degree of saponification (mole %)] | | [10] | [10] | [10] | [10] | [0] | [0] |
| [Silyl group-modification ratio (mole %)] | | [—] | [—] | [—] | [—] | [0.1] | [—] |
| Si(OMe)$_4$ (parts by weight) | | 2.5 | 2.5 | 2.5 | 2.5 | 2.5 | 2.2 |
| Vinyltriethoxysilane (parts by weight) | | — | — | — | — | — | — |
| γ-glycidoxypropyltrimethoxysilane (parts by weight) | | — | — | — | — | — | 0.1 |
| Other additives (parts by weight) | | — | — | — | — | — | smectite 0.1 |
| Ratio of metal alkoxide component | | 9.2 | 9.0 | 8.3 | 7.9 | 8.1 | 7.1 |
| Amount of carboxylic acid-based compounds (mole %) | Remaining ratio of acyl group (mole %) | | | | | | |
| | 45 | 42 | 42 | 42 | 42 | 42 | 42 |
| | 35 | 30 | 30 | 30 | 30 | 30 | 30 |
| | 25 | 20 | 20 | 20 | 20 | 20 | 20 |
| | 15 | 8 | 8 | 8 | 8 | 8 | 6 |
| | 5 | 2 | 2 | 2 | 2 | 2 | 2 |
| Remaining ratio of acyl group in the composition (mole %) | | <1 | <1 | <1 | <1 | <1 | <1 |
| Gas-barrier properties | | | | | | | |
| 20° C., 65% RH [cc · 20 μm/m² · 24 hr · atm] | | <0.1 | <0.1 | 0.5 | 0.5 | <0.1 | <0.1 |
| (60° C., 100% RH)/(20° C., 65% RH) | | 1.5 | 1.5 | 1.1 | 1.1 | 1.8 | 1.5 |
| (90° C., 100% RH)/(20° C., 65% RH) | | 4.0 | 4.0 | 2.2 | 2.2 | 4.0 | 3.5 |
| Property unevenness (ratio of defective parts) | | 0/10 | 0/10 | 0/10 | 0/10 | 0/10 | 0/10 |
| Property unevenness (property variation) | | <2 | <2 | <2 | <2 | <2 | <2 |
| Bending resistance (bent 100 times) | | 0/10 | 0/10 | 0/10 | 0/10 | 0/10 | 0/10 |
| Appearance | | ○ | ○ | ○ | ○ | ○ | ○ |

EXAMPLE 32

Example 2 was repeated except that 17.5 part by weight of a 0.1 mole % (based on the moles of acetoxy group) silyl group-modified polyvinyl acetate was used instead of 17.5 part by weight of the polyvinyl acetate, to obtain a colorless transparent monolayer film comprising a modified polyvinyl alcohol/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 5.

EXAMPLE 33

Example 2 was repeated except that a mixture of 2.2 parts by weight of tetramethoxysilane, 0.1 part by weight of smectite having been given hydrophilic treatment and having an aspect ratio of 1,000 and 0.1 part by weight of In Table 5, "Ratio of metal alkoxide component", "Amount of carboxylic acid-based compounds", "Remaining ratio of acyl group", "20° C., 65% RH", "(60° C., 100% RH)/(20° C., 65% RH)" and "(90° C., 100% RH)/(20° C., 65% RH)" are the same as explained for Table 1. In the same Table, "Vinyl alcohol polymer or precursor" means the vinyl alcohol polymer and/or vinyl alcohol polymer-forming precursor used for preparation of the composition, and "PVAc", "PVA", "VAc", "EVAc" and "EVOH" represent "polyvinyl acetate", "polyvinyl alcohol", "vinyl acetate monomer", "ethylene-vinyl acetate copolymer" and "ethylene-vinyl alcohol copolymer", respectively.

EXAMPLE 34

Example 2 was repeated except that the perforation ratio of the sealing film was changed from 1% to 10% and that the succeeding reaction procedure was changed such that: the reaction was conducted at 60° C. for 4 hours, then, when the remaining ratio of the acyl group in organic polymers present in the reaction mixture reached 55 mole %, the reaction pressure was reduced to 150 mmHg, and, while the amount of carboxylic acid-based compounds (acetic acid-based compounds in this Example) contained in the reaction mixture was so controlled as to satisfy the formula (I), the reaction was continued at 60° C; after 4 hours, the pressure was reduced to 30 mmHg and the reaction was continued at 40° C. for 4 hours. As a result, there was obtained a colorless transparent monolayer film comprising a polyvinyl alcohol/silica complex and a colorless transparent laminated film comprising a layer of the same complex and the PET film.

The time rate of change of the amount of the carboxylic acid-based compounds in the reaction mixture during the reaction and the results of evaluation on the obtained monolayer film and laminated film, for the gas-barrier properties, property unevenness and bending resistance are shown in Table 6.

EXAMPLES 35 THROUGH 40

Example 34 was repeated except that the amount of carboxylic acid-based compounds present in the reaction mixture was changed as shown in Table 6 by changing the reaction pressure and temperature, to obtain colorless transparent monolayer films comprising a polyvinyl alcohol/silica complex and colorless transparent laminated films comprising a layer of the same complex and the PET film.

The results of evaluation on the obtained monolayer films and laminated films, for the gas-barrier properties, property unevenness and bending resistance are shown in Table 6.

EXAMPLE 41

There was dissolved 17.0 parts by weight of a polyvinyl acetate having a degree of polymerization of 500 and an ethylene content of 10 mole % based on the moles of total constituting units in 200 parts by weight of methanol. To the solution, 2.5 parts by weight of tetramethoxysilane, 0.5 part by weight of distilled water and 1.0 part by weight of 1N (normal)-hydrochloric acid were added, to prepare a sol. The sol was subjected to reaction with stirring at 60° C. for 4 hours. The obtained sol was transferred to a flat-bottom polytetrafluoroethylene (TEFLON, made by du Pont Co.) container to a height of 2 mm. The open, top part of the container was sealed with a polyvinylidene chloride film (SARAN WRAP, made by Asahi Chemical Industry Co., Ltd.). The contents were further permitted to continue reaction at 60° C. for 4 hours. Thereafter, the sealing film was perforated with a needle to a perforation ratio by area of 1% and the reaction was continued again at 60° C. for 4 hours. When the remaining ratio of the acyl group (remaining ratio of acetyl group in this Example) in organic polymers present in the reaction mixture reached 60 mole %, the reaction zone pressure was changed to a reduced pressure of 100 mmHg, and the reaction was continued at 60° C. while the amount of carboxylic acid-based compounds (acetic acid-based compounds in this Example) present in the reaction mixture was controlled such that the formula (I) was satisfied. After 4 hours, the pressure was changed to 20 mmHg and the reaction was continued at 40° C. for 4 hours.

A colorless transparent monolayer film comprising a polyvinyl alcohol containing 10 mole % of ethylene units based on the moles of total constituting units/silica complex was thus obtained.

Separately, part of the sol-like reaction mixture to be transferred to the polytetrafluoroethylene container was taken out and applied on a PET film having a thickness of 12 $\mu$m. The film with the sol was subjected to reaction in the same manner as above, to give a colorless transparent laminated film comprising a layer of the polyvinyl alcohol/silica complex and the PET film.

The monolayer film was tested for the gas-barrier properties and property unevenness and the laminated film for the bending resistance. The results obtained are shown in Table 6, which also shows the amounts of the carboxylic acid-based compounds present in the reaction mixture at stages after the remaining ratio of the acyl group had become not more than 45 mole %, each of the amounts determined successively every time when the remaining ratio reduced by 10 mole %.

TABLE 6

| Example | | | Example 34 | Example 35 | Example 36 | Example 37 | Example 38 | Example 39 | Example 40 | Example 41 |
|---|---|---|---|---|---|---|---|---|---|---|
| Ratio of metal alkoxide component | | | 8.1 | 8.1 | 8.1 | 8.1 | 8.1 | 8.1 | 8.1 | 7.7 |
| Amount of carboxylic acid-based compounds (mole %) | Remaining ratio of acyl group (mole %) | 45 | 35 | 8 | 45 | 50 | 50 | 40 | 40 | 40 |
| | | 35 | 25 | 7 | 35 | 60 | 50 | 30 | 32 | 25 |
| | | 25 | 15 | 5 | 25 | 70 | 20 | 20 | 30 | 15 |
| | | 15 | 6 | 3 | 16 | 50 | 5 | 20 | 18 | 10 |
| | | 5 | 1 | 1 | 8 | 0 | 1 | 20 | 1 | 2 |
| Remaining ratio of acyl group in the composition (mole %) | | | <1 | <1 | <1 | <1 | <1 | <1 | <1 | <1 |
| Gas-barrier properties | | | | | | | | | | |
| 20° C., 65% RH [cc · 20 $\mu$m/m² · 24 hr · atm] | | | <0.1 | <0.1 | <0.1 | <0.1 | <0.1 | <0.1 | <0.1 | <0.1 |
| (60° C., 100% RH)/(20° C., 65% RH) | | | 1.5 | 1.5 | 1.5 | 1.5 | 1.5 | 1.5 | 1.5 | 1.5 |
| (90° C., 100% RH)/(20° C., 65% RH) | | | 3.5 | 3.5 | 3.5 | 3.5 | 3.5 | 3.5 | 3.5 | 3.5 |
| Property unevenness (ratio of defective parts) | | | 0/10 | 0/10 | 0/10 | 0/10 | 0/10 | 0/10 | 0/10 | 0/10 |
| Property unevenness (property variation) | | | <2 | <2 | <2 | <2 | <2 | <2 | <2 | <2 |
| Bending resistance (bent 100 times) | | | 0/10 | 0/10 | 0/10 | 0/10 | 0/10 | 0/10 | 0/10 | 0/10 |
| Appearance | | | ◯ | ◯ | ◯ | X | X | X | X | ◯ |

In Table 6, "Ratio of metal alkoxide component", "Amount of carboxylic acid-based compounds", "Remaining ratio of acyl group", "20° C., 65% RH", "(60° C., 100% RH)/(20° C., 65% RH)" and "(90° C., 100% RH)/(20° C., 65% RH)" are the same as explained for Table 1.

The followings are understood from Tables 1 through 6. The processes of Examples 1 through 41 according to the present invention can produce compositions comprising a vinyl alcohol polymer (polyvinyl alcohol, ethylene-vinyl alcohol copolymer or the like) and a metal oxide (silica, silica-titania, silica-alumina or silica-zirconia), without causing property unevenness, the composition not only exhibiting excellent gas-barrier properties under the usual temperature and humidity conditions, but suffering little decrease in the gas-barrier properties under high-temperature and high-humidity conditions and showing no decrease in the gas-barrier properties even after being repeatedly bent. Among these, use of a metal alkoxide component in an amount of the metal atom contained in the metal alkoxide of 0.01 to 80 moles based on 100 moles of the acyl group contained in the vinyl carboxylate polymer used (Examples 1 through 3, 5 through 11 and 13 through 41) results in production of compositions having still better bending resistance; and use of that in an amount of 0.01 to 60 moles on the same basis (Examples 1 and 2, 5 through 11 and 13 through 41) results in production of compositions having particularly better bending resistance. Where the reaction was effected while the amount of carboxylic acid-based compounds in the reaction mixture was controlled such that the formula (I) is satisfied (Examples 1 through 36 and 41), the obtained compositions had excellent appearance, i.e. transparent and not colored.

On the other hand, a polyvinyl alcohol alone (Comparative Examples 1 and 2) suffers a serious decrease in the gas-barrier properties when exposed to high-temperature and high-humidity conditions. Although polycondensation of a metal alkoxide in the presence of a vinyl alcohol polymer (Comparative Examples 3 and 4) leads to production of compositions comprising a vinyl alcohol polymer and a metal oxide, these compositions suffer a large decrease in the gas-barrier properties when exposed to high-temperature and high-humidity conditions, have large unevenness in gas-barrier properties (i.e. large position dependency of the gas-barrier properties in the compositions), and tend to lose the gas-barrier properties when repeatedly bent. Reaction of a vinyl carboxylate polymer with a metal alkoxide according to the known in-situ sol-gel reaction-saponification process but in a ratio outside the range specified by the present invention (Comparative Example 5) produces a composition whose gas-barrier properties are readily impaired when the composition is repeatedly bent and have a large unevenness in the gas-barrier properties.

INDUSTRIAL APPLICABILITY

According to the process of the present invention, there can be produced vinyl alcohol polymer compositions comprising a metal oxide, which can maintain at high levels their excellent gas-barrier properties even under high-temperature and high-humidity conditions and even after being repeatedly bent, without having property unevenness. Accordingly, the present invention provides a process for producing, commercially advantageously, materials, which exhibit excellent gas-barrier properties under severe conditions and are hence useful as food-packaging materials and the like.

What is claimed is:

1. A process for producing vinyl alcohol polymer compositions comprising a metal oxide and a vinyl alcohol polymer, which comprises using a solution comprising a metal alkoxide or oligomers thereof, a vinyl carboxylate polymer and an organic solvent, and, while removing low boiling substances containing the organic solvent, conducting both polycondensation of said metal alkoxide or oligomers thereof and saponification of said vinyl carboxylate polymer in parallel with each other and in the same reaction zone, said solution containing said metal alkoxide or oligomers thereof in a ratio of 0.01 to 100 moles of the metal atom contained in said metal alkoxide or oligomers thereof, based on 100 moles of the acyl group originating from the vinyl carboxylate unit present in said vinyl carboxylate polymer.

2. The process according to claim 1, wherein the reaction is continued up to a stage where the remaining ratio, in organic polymers contained in the reaction mixture, of the acyl group originating from the vinyl carboxylate unit present in said vinyl carboxylate polymer reaches 10 mole % or below.

3. The process according to claim 1, wherein said polycondensation of said metal alkoxide produces a macromolecular metal oxide.

4. The process according to claim 1, wherein said vinyl carboxylate polymer is selected from the group consisting of vinyl acetate, vinyl propionate and vinyl-2-methylpropionate.

5. The process according to claim 1, wherein said vinyl carboxylate polymer obtained by addition polymerization of a vinyl carboxylate and a comonomer selected from the group consisting of an α-olefin, a vinyl ether, an allyl alcohol, and vinyltrimethylsilane.

6. The process according to claim 1, wherein a polymerization degree of said vinyl carboxylate polymer is 300 to 6000.

7. The process according to claim 1, wherein said vinyl carboxylate polymer has been modified by silyl-group modification or boronic acid-modification.

8. The process according to claim 7, wherein a modification ratio is not more than 0.1 mole %.

9. The process according to claim 1, wherein a saponification degree of said vinyl carboxylate polymer is not more than 50 mole %.

10. The process according to claim 1, wherein said metal alkoxide is selected from the group consisting of a silicone alkoxide, a metal alkoxide other than silicone alkoxide, an oligomer of a metal alkoxide comprising a unit of a silicone alkoxide, and an oligomer of a metal alkoxide comprising no unit of a silicone alkoxide.

11. The process according to claim 1, wherein said metal alkoxide is an alkoxy titanium compound, an alkoxy aluminum or an alkoxyzirconium.

12. The process according to claim 1, wherein a content of silicone in said metal alkoxide is at least 20 mole % based on a total amount of metal atoms.

13. The process according to claim 1, wherein an amount of a metal atom in the metal alkoxide based on 100 moles of an acyl group originating from a vinyl carboxylate unit in the vinyl carboxylate polymer is 0.01 to 80 moles.

14. The process according to claim 2, wherein said remaining ratio of said acyl group originating from said vinyl carboxylate unit reaches 5 mole % or below.

15. The process according to claim 2, wherein said remaining ratio of said acyl group originating from said vinyl carboxylate unit reaches 1 mole % or below.

16. The process according to claim 2, wherein said remaining ratio of said acyl group originating from said vinyl carboxylate unit reaches 0.1 mole % or below.

17. The process according to claim 1, wherein a reaction temperature is 20 to 110° C.

18. The process according to claim 1, wherein a reaction time is 0.5 to 120 hours.

* * * * *